US010703366B2

(12) United States Patent
Chen et al.

(10) Patent No.: US 10,703,366 B2
(45) Date of Patent: Jul. 7, 2020

(54) INHIBITING HIGHWAY ASSIST MODE

(71) Applicant: Ford Global Technologies, LLC, Dearborn, MI (US)

(72) Inventors: Xingping Chen, Troy, MI (US); Kevin Wegienka, Canton, MI (US); Shane Elwart, Ypsilanti, MI (US); Bo Wu, Northville, MI (US); Aaron L. Mills, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 221 days.

(21) Appl. No.: 15/689,987

(22) Filed: Aug. 29, 2017

(65) Prior Publication Data

US 2019/0061755 A1 Feb. 28, 2019

(51) Int. Cl.
*B60W 30/14* (2006.01)

(52) U.S. Cl.
CPC ....... *B60W 30/143* (2013.01); *B60W 2530/14* (2013.01); *B60W 2552/00* (2020.02); *B60W 2555/60* (2020.02); *B60W 2556/60* (2020.02); *B60W 2720/10* (2013.01)

(58) Field of Classification Search
CPC ........... B60W 30/143; B60W 2530/14; B60W 2550/14; B60W 2550/22; B60W 2550/406; B60W 2720/10; B60W 30/14
USPC .......................................................... 701/93
See application file for complete search history.

(56) References Cited

U.S. PATENT DOCUMENTS

| 6,161,072 | A | 12/2000 | Clapper | |
|---|---|---|---|---|
| 6,734,803 | B1 * | 5/2004 | Bode | G01C 21/165 340/8.1 |
| 7,260,465 | B2 * | 8/2007 | Waldis | B60K 31/0008 340/905 |
| 8,843,292 | B2 | 9/2014 | Heft et al. | |
| 2003/0204299 | A1 * | 10/2003 | Waldis | B60K 31/0008 701/96 |
| 2011/0098922 | A1 * | 4/2011 | Ibrahim | B60W 40/08 701/532 |
| 2013/0226365 | A1 * | 8/2013 | Brozovich | G06Q 50/30 701/1 |
| 2015/0100216 | A1 | 4/2015 | Rayes | |
| 2015/0175158 | A1 | 6/2015 | Wagner | |

FOREIGN PATENT DOCUMENTS

DE 102011055495 A1 5/2013
JP 2013190840 A 9/2013

* cited by examiner

*Primary Examiner* — Muhammad Shafi
(74) *Attorney, Agent, or Firm* — Frank A. MacKenzie; Bejin Bieneman PLC

(57) ABSTRACT

A computer for a vehicle is described. The computer includes a processor and memory storing instructions executable by the processor. The instructions include, to: determine a trigger to initiate a highway assist mode; based on the determined trigger, determine vehicle-location data; and based on the data, inhibit initiation of the mode.

20 Claims, 4 Drawing Sheets

INHIBITING HIGHWAY ASSIST MODE

BACKGROUND

When driving for long periods of time, a driver may initiate cruise control so that the driver need not place his foot continuously on the accelerator while driving. More modern advancements include vehicle computers which may control braking, accelerating, and steering based on the roadway and the actions of surrounding vehicles.

DETAILED DESCRIPTION

Figure 1:
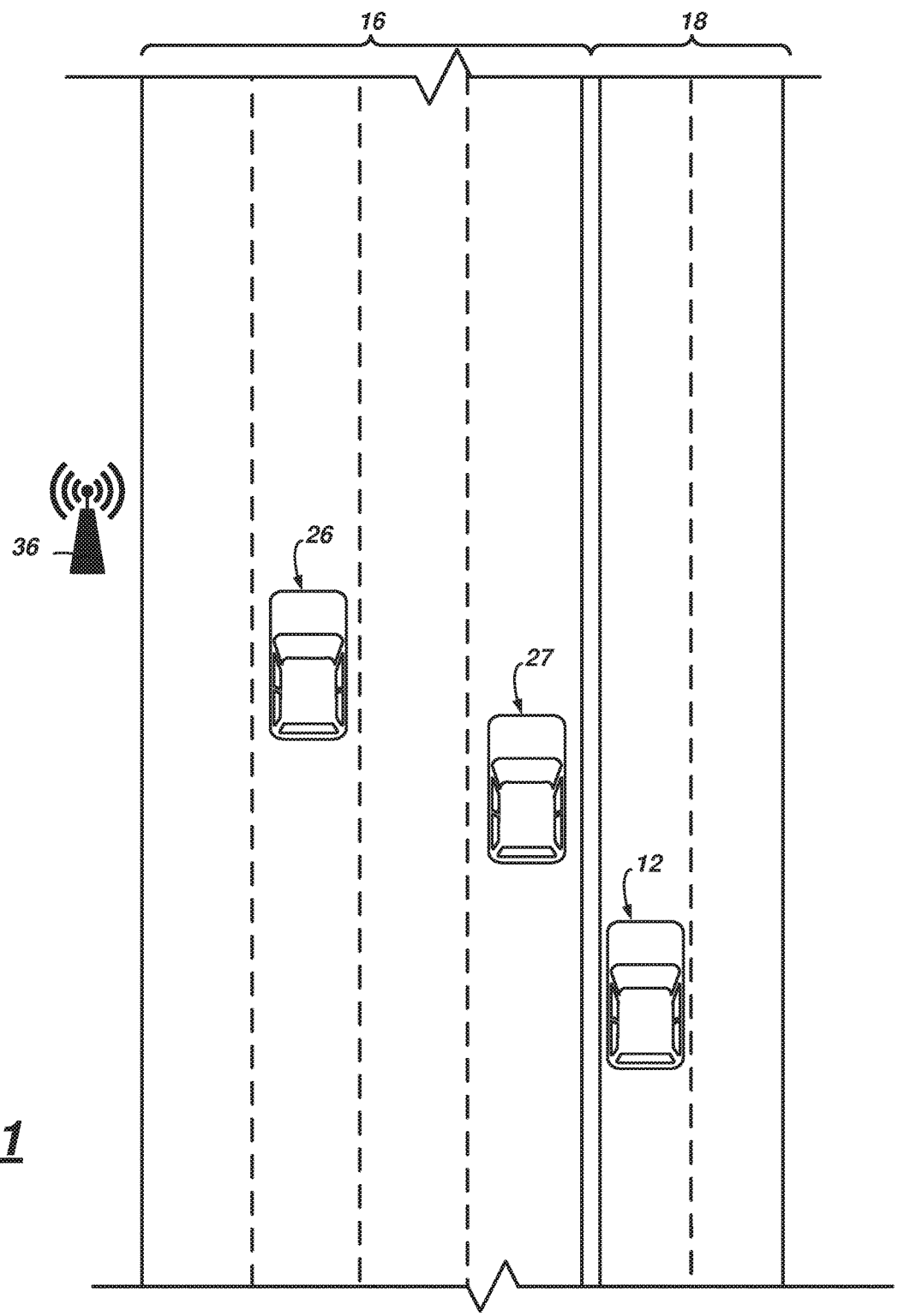
FIG. 1 illustrates a schematic view of a vehicle traveling on a portion of a vehicle service drive while other vehicles are traveling on an adjacent expressway.

A driver assist system is described that includes a vehicle computer that includes a processor and memory storing instructions executable by the processor. The instructions may include, to: determine a trigger to initiate a highway assist mode; based on the determined trigger, determine vehicle-location data; and based on the data, inhibit initiation of the mode.

According to the at least one example set forth above, the data comprises receiving differential GPS data indicating the vehicle's position.

According to the at least one example set forth above, wherein determining vehicle-location data further comprises, prior to inhibiting initiation, to: receive GPS data; receive GPS correction data from a base station; and use the GPS data and GPS correction data to identify a vehicle location.

According to the at least one example set forth above, wherein data comprises GPS correction data.

According to the at least one example set forth above, wherein data comprises cloud-map data.

According to the at least one example set forth above, wherein the data comprises on-ramp data.

According to the at least one example set forth above, wherein the on-ramp data comprises a length of a roadway on-ramp, wherein the instructions further include: to derive a roadway speed limit based on the length.

According to the at least one example set forth above, wherein the data comprises drive history data.

According to the at least one example set forth above, wherein the drive history data is an average of vehicle speed history for a single driver of a vehicle on a respective roadway.

According to the at least one example set forth above, wherein the drive history data is an average of vehicle speed history for multiple drivers of a vehicle on a respective roadway.

According to the at least one example set forth above, wherein the data comprises driver study data.

According to another illustrative example, a vehicle computer includes a processor and memory storing instructions executable by the processor. The instructions may include, to: prior to initiating a highway assist mode, verify a roadway upon which a vehicle is moving; and based on the verification, inhibit initiation of the mode.

According to the at least one example set forth above, wherein the verification comprises identifying a vehicle location using GPS data and differential GPS data.

According to the at least one example set forth above, wherein the verification comprises evaluating vehicle-location data after receiving a trigger for the mode.

According to the at least one example set forth above, wherein data comprises cloud-map data.

According to the at least one example set forth above, wherein the data comprises on-ramp data.

According to the at least one example set forth above, wherein the data comprises drive history data.

According to the at least one example set forth above, wherein the data comprises driver study data.

According to another illustrative example, a method includes: determining, at a computer in a vehicle, a trigger to initiate a highway assist mode; based on the determined trigger, determining vehicle-location data; and based on the data, inhibiting initiation of the mode.

According to the at least one example set forth above, wherein determining vehicle-location data further comprises evaluating at least one of: differential GPS data, cloud-map data, on-ramp data, drive history data, or driver study data.

According to the at least one example, a computer is disclosed that is programmed to execute any combination of the examples set forth above.

According to the at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the examples of the method(s) set forth above.

Now turning to the figures, wherein like numerals indicate like parts throughout the several views, there is shown a driver assist system 10 for a vehicle 12 that enables the vehicle to operate in a highway assist mode. In the highway assist mode, at least one computer 14 of the system 10 controls vehicle speed and steering at so-called expressway speeds. When the driver assist system 10 comprises so-called adaptive features, computer 14 may determine that the vehicle 12 is on an expressway 16 (FIGS. 1, 3) and auto-initiate the mode (e.g., based triggers such as vehicle speed and location data). Such adaptive features are designed to improve the user experience by predictively initiating vehicle features which are presumed to aid the driver. As discussed herein, computer 14 may be programmed to inhibit this initiation under certain circumstances. For example, some location data determined at vehicle 12 (e.g., via a GPS unit) may indicate that the vehicle 12 is located on an expressway; however, due to relatively slow refresh rates of GPS data (e.g., about 1 Hz) and/or other GPS inaccuracies, the vehicle 12 in fact may be located on another roadway 18 (e.g., a non-expressway such as an adjacent vehicle service drive). For example, GPS location data provided on many vehicles have approximately +/−5 meters of accuracy. Consequently, when expressway 16 and roadway 18 are adjacent one another (e.g., as in FIG. 1), a GPS unit in vehicle 12 may not accurately identify that the vehicle 12 is on the roadway 18 (e.g., and mistakenly identify the vehicle 12 to be on the expressway 16 instead). Consequently, the driver assist system 10 may actuate the highway assist mode causing the vehicle 12 to accelerate to an expressway speed (e.g., 70 miles per hour (mph)) when in fact the posted speed limit of the service drive 18 may be substantially less (e.g., 45 mph)—and surprising the driver of vehicle 12 and causing user dissatisfaction.

Thus, in these instances, it may be desirable to inhibit the vehicle 12 from initiating the highway assist mode. As will be described more below, system 10 may inhibit the vehicle 12 from initiating the highway assist mode by first verifying additional vehicle-location data such as GPS correction data, cloud-map data, driver history data, driver study data, and/or the like. Of course, in instances when computer 14 confirms the vehicle 12 is on an expressway (e.g., such expressway 16), the system 10 may be permitted to initiate the highway assist mode. However, when computer 14 is unable to confirm that vehicle 12 is on expressway 16 (e.g., as it is not in FIG. 1), then the computer 14 may inhibit highway assist mode initiation.

Vehicle 12 is shown as a passenger car; however, vehicle 12 could also be a truck, sports utility vehicle (SUV), recreational vehicle, bus, or the like that includes the driver assist system 10. Vehicle 12 may be operated in a partially autonomous mode—e.g., such as a so-called level 2, level 3, or level 4 autonomous mode, as defined by the Society of Automotive Engineers (SAE) (which has defined operation at levels 0-5). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention. In at least one example, the highway assist mode provides level 3 autonomy; of course, this is an example, and driver assist system 10 may operate according to other levels instead.

Vehicle 12 may comprise a wired or wireless network connection 20 that permits intra-vehicle communication between multiple electronic devices within driver assist system 10, including: the computer 14, a positioning unit 22, and a telematics device 24. In at least one example, network connection 20 includes one or more of a controller area network (CAN) bus, Ethernet, Local Interconnect Network (LIN), a fiber optic connection, or the like. Other examples also exist. For example, alternatively or in combination with e.g., a CAN bus, connection 20 could comprise one or more discrete wired or wireless connections.

Computer 14 may be a single computer (or multiple computing devices—e.g., shared with other vehicle systems and/or subsystems). In at least one example, computer 14 is or is part of a collision avoidance module or a driver assist module; however, these are merely examples. Computer 14 may control vehicle acceleration, deceleration, braking, and steering in the highway assist mode. For example, in the highway assist mode, computer 14 may control acceleration or deceleration of vehicle 12 so that the vehicle is adequately spaced from other vehicles on the roadway (e.g., providing adequate emergency or evasive-action response time)—i.e., so that vehicle 12 has an appropriate gap in between it and a vehicle located forward of it. Further, in the highway assist mode, computer 14 may control lateral positioning by steering the vehicle 12 so that it remains within roadway markings (e.g., such as lane markers). As used herein, a highway assist mode comprises an at least partially autonomous driving mode that controls vehicle speed based at least partially on the speed of vehicles on the same roadway as vehicle, that controls vehicle lateral movement based at least partially on roadway markings, and which is initiated only when the speed of the vehicle is larger than a predetermined threshold. As used herein, a roadway is a relatively long, smooth stretch of road adapted for motor vehicle travel. Roadways include highways, freeways, expressways, service drives, side streets, and other controlled- or limited-access roads. An expressway may be a type of roadway having a predetermined minimum authorized, posted speed limit; and as used herein, other types of roadways may or may not have minimum authorized, posted speed limits. As used herein, a posted speed limit is a vehicle speed limit designated by a government or other similar authorized or governing agency. And as used herein, roadway markings are indicia on the roadway which indicate to a vehicle or its driver a predetermined path to follow (e.g., non-limiting examples of indicia include lane markers, symbols, text, etc.).

Computer 14 may comprise a processor 28 coupled to memory 30. For example, processor 28 can be any type of device capable of processing electronic instructions, non-limiting examples including a microprocessor, a microcontroller or controller, an application specific integrated circuit (ASIC), etc.—just to name a few. In general, computer 14 may be programmed to execute digitally-stored instructions, which may be stored in memory 30, which enable the computer 14, among other things, to: determine a trigger to initiate a highway assist mode (e.g., such as the vehicle traveling a minimum threshold speed (other examples will be provided below)); based on the determined trigger, determine vehicle-location data; and based on the vehicle-location data, inhibit initiation of the highway assist mode. As will be described more below, vehicle-location data may take a variety of forms—e.g., including but not limited to: GPS data from on onboard positioning unit (e.g., from unit 22); GPS correction data received, via telematics device 24, from local infrastructure (e.g., such as a base station, etc.); cloud-map data; just to name a few examples.

Memory 30 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 30 may store one or more computer program products which may be embodied as software, firmware, or the like.

Positioning unit 22 includes any suitable electronic device used to determine position data and/or heading data of the vehicle 12. Non-limiting examples of unit 22 include devices which receive satellite signals such as a Global Positioning System (GPS) unit and a Global Navigation Satellite System (GLONASS) unit. As described below, GPS data and/or GLONASS data are two types of vehicle-location data. In at least one example, the positioning unit 22 comprises a GPS unit capable of receiving differential GPS data to indicate the vehicle's position. In other examples, the positioning unit is a standard GPS (or standard GLONASS) unit; as used herein, a standard GPS unit (or standard GLONASS unit) is one which is not configured to provide differential GPS data and has an accuracy limited to +/−2 meters or more. In at least one example, the standard GPS (or GLONASS) unit has an accuracy limited to about +/−5 meters. Thus, as will be explained more below, vehicle-location data received from a standard GPS unit may require additional vehicle-location data to distinguish the vehicle's position between nearby or adjacently-located roadways (e.g., such as 16, 18).

Telematics device 24 may be any suitable telematics computing device configured to wirelessly communicate with other electronic devices. Such wireless communication may include use of cellular technology (e.g., LTE, GSM, CDMA, and/or other cellular communication protocols), short range wireless communication technology (e.g., using Wi-Fi, Bluetooth, Bluetooth Low Energy (BLE), dedicated short range communication (DSRC), and/or other short range wireless communication protocols), or a combination thereof. Such communication includes so-called vehicle-to-vehicle (V2V) and vehicle-to-infrastructure (V2I) communications as well—all of which will be appreciated by those skilled in the art.

According to at least one example, telematics device 24 is configured to communicate via DSRC with roadway infrastructure—e.g., which includes one or more base stations 36 (described more below). This communication may be one-way or two-way wireless communication. In one example, telematics device 24 receives at least one-way communication from the base station(s) 36, and as described more below, this communication may include GPS correction data (e.g., to supplement vehicle-location data received via positioning unit 22). Depending on the circumstances, the GPS correction data may be used to supplement location data from standard GPS units and/or differential GPS units.

Thus, as discussed above, computer 14 (using information received from positioning unit 22 and telematics device 24) may control actuation of the highway assist mode—e.g., initiating the highway assist mode based on one or more triggers. Trigger(s) may indicate a predetermined confidence threshold that the highway assist mode is appropriate; e.g., according to one non-limiting example, this confidence threshold may be 95%.

As an example, one trigger may be the speed of vehicle 12 exceeding a predetermined speed threshold. For example, when vehicle 12 increases its speed more than the threshold (e.g., 50 mph), computer 14 may determine a trigger to initiate the highway assist mode. Another trigger may be a dwelling duration at or above the predetermined threshold; e.g., computer 14 may determine a trigger to initiate the highway assist mode when the vehicle maintains and/or exceeds the predetermined (speed) threshold for a predetermined duration. Yet another trigger may be determining that a stretch of roadway does not exceed a maximum rate of curvature (e.g., with respect to the upcoming predetermined length of roadway). Yet another trigger may be determining an average rate of speed of other vehicles on the respective roadway (e.g., using the speeds of vehicles 26, 27). The trigger also may comprise vehicle-location data, received from positioning unit 22, indicating that the vehicle 12 is traveling on or proximate an expressway 16. These are merely examples and are not intended to be limiting. Thus, according to at least one example, computer 14 may determine a trigger to initiate the highway assist mode based on: (a) vehicle-location data indicating that the vehicle is located on an expressway 16 (e.g., having a posted speed limit of 70 mph); and (b) the vehicle 12 maintaining and/or exceeding a predetermined speed threshold (e.g., at least 50 mph) for a predetermined duration (e.g., 6 seconds).

In light of the discussion above, it is in such exemplary circumstances that the vehicle 12 could, without the instructions described in the exemplary process (400) described below, trigger the highway assist mode when the vehicle 12 is in fact not on an expressway 16. For instance, continuing with the example of service drive 18 (shown in FIG. 1), computer 14 may determine based on slightly inaccurate vehicle-location data (e.g., from positioning unit 22) that the vehicle 12 is on expressway 16 (e.g., instead of service drive 18) while the driver is operating the vehicle 12 at 50+ mph for at least six seconds (e.g., even when the posted speed limit of the service drive may be 45 mph). The process 400 described below gives an example of how computer 14 may be programmed to inhibit the vehicle 12 from initiating the highway assist mode. In this manner, vehicle 12 may be inhibited from assuming driving control and suddenly accelerating to 70 mph on a vehicle service drive 18 which has a posted speed limit of 45 mph or the like.

Figure 2:
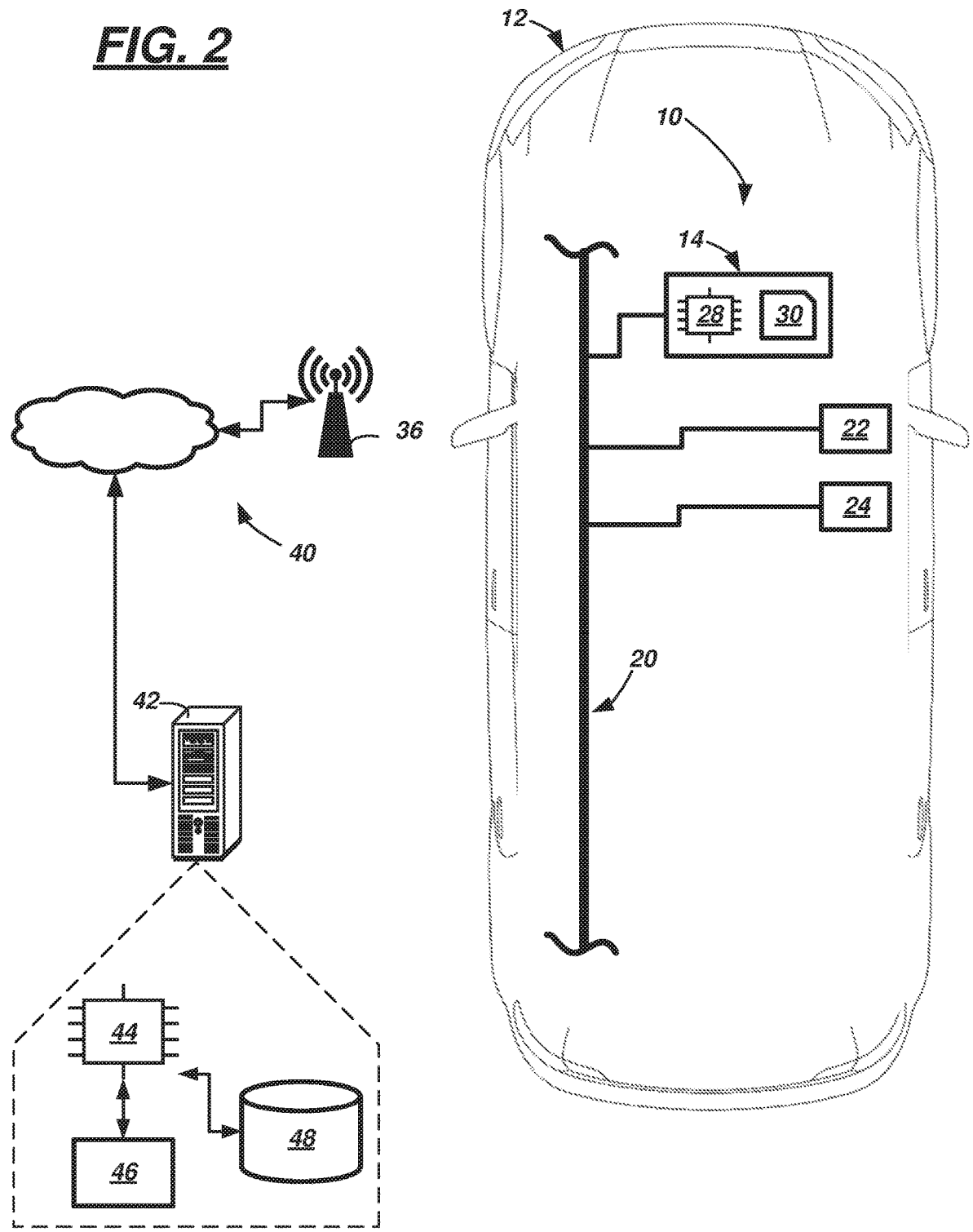
FIG. 2 illustrates a schematic view a driver assist system that includes a vehicle computer in communication with a backend server via a communication network.

Before describing the process 400, the remaining elements shown in FIG. 2 will be described. A communication network 40 may comprise a land communication network, a wireless communication network, or a combination thereof, as will be appreciated by those skilled in the art. For example, a land communication network can enable connectivity to public switched telephone network (PSTN) such as that used to provide hardwired telephony, packet-switched data communications, internet infrastructure, and the like. And a wireless communication network (coupled to the land communication network) may include satellite communication architecture, cellular telephone architecture to cover wide geographic region(s), and short- and/or medium-range wireless communication architecture. Thus, in at least one example, network 40 includes any suitable cellular infrastructure that could include interconnected eNodeBs, serving gateways, base stations 36, and the like. Further, network 40 may utilize or interface to any suitable existing or future cellular technology (e.g., including LTE, CDMA, GSM, etc.) and/or existing or future short- or medium-range wireless technology (e.g., such as dedicated short range communication (DSRC)).

FIG. 1 also illustrates a remote server 42 also coupled communicatively to communication network 40. The server 42 may be used to provide one or more backend services, including storing and providing some types of vehicle-location data (e.g., including cloud-map data, on-ramp data, drive history data, driver study data, and the like). As used herein, cloud-map data comprises data derived from internet- or cloud-based digital maps which provide either data regarding an average speed of vehicles traveling on roadways or data regarding a posted speed limit with respect to that portion of roadway. These digital maps are typically updated and maintained via a server which hosts a website, mobile software application, or the like (e.g., one non-limiting commercial implementation is Waze™). As used herein, on-ramp data comprises data pertaining to parameters of an expressway on-ramp 43 (see FIG. 3)—i.e., a ramp used to enter an expressway from another roadway. One non-limiting example of the on-ramp data includes a length (l) of the on-ramp 43 (e.g., from which the posted speed limit may be derived). For example, computer 14 may measure (e.g., using light detection and ranging devices, wheel rotations, etc.) the length (l) of a respective on-ramp 43, or computer 14 may determine the length (l) based on digital maps or the like. As used herein, drive history data comprises historical data comprising the speed(s) the respective vehicle 12 has driven when driving on the current portion of the roadway; as used herein, historical data is data which pertains to previous instances that vehicle drove upon the roadway. In at least one example, drive history data pertains to the present driver of the vehicle 12; however, this is not required. For example, drive history data also could comprise an average of driving speeds of multiple drivers (for a respective roadway). Thus, as will be explained below, using drive history data, computer 14 may average the vehicle speed history (of one or multiple drivers) to determine verify whether the roadway is an expressway 16 or non-expressway 18 (e.g., determining it to be an expressway 16 when the average speed exceeds a predetermined threshold). And as used herein, driver study data comprises a compilation of data indicating what speed drivers of different vehicles have driven the current portion of roadway. This may be clinical or survey data, or it may have been derived using other means. As used herein, vehicle-location data comprises each of these exemplary data types (e.g., cloud-map data, on-ramp data, drive history data, and driver study data), as each of these examples pertain to a roadway or a particular region of a roadway. These are merely examples of types of vehicle-location data that may be stored by server 42; other types exist as well.

Server 42 may comprise one or more processors 44 coupled to memory 46. For example, processor 44 can be any type of device capable of processing electronic instructions, non-limiting examples including a microprocessor, a microcontroller or controller, an application specific integrated circuit (ASIC), etc.—just to name a few. In general, processor(s) 44 may be programmed to execute digitally-stored instructions, which may be stored in memory 46, which enable the server 42, among other things, to communicate with vehicle 12 and send data to vehicle computer 14 (e.g., upon request).

Memory 46 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 46 may store one or more computer program products which may be embodied as software, firmware, or the like.

According to at least one example, server 42 may comprise one or more databases 48 as well—e.g., coupled to processor(s) 44. Database(s) 48 may be used to store the cloud-map data, on-ramp data, drive history data, driver study data, and the like, discussed above.

Figure 4:
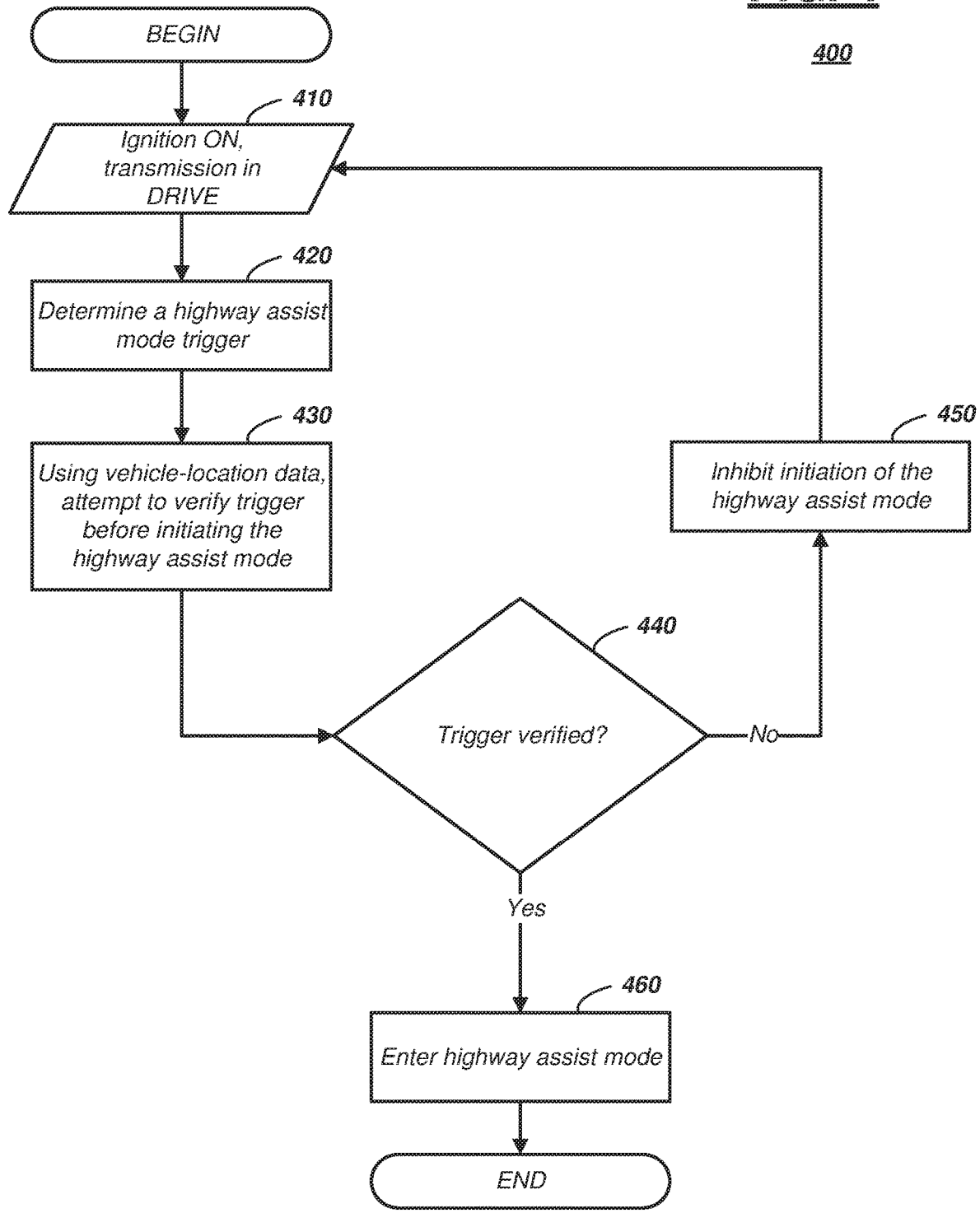
FIG. 4 is a flow diagram illustrating a process executable by the driver assist system which can inhibit initiation of a highway assist mode.

Turning now to FIG. 4, a flow diagram is illustrated showing an example process 400 for inhibiting the vehicle 12 from initiating the highway assist mode when the vehicle 12 is not on an appropriate roadway for highway assist. The process begins with block 410 which identifies that an engine (not shown) of vehicle 12 is in the ON state and a transmission (not shown) of the vehicle 12 is in a DRIVE state. For example, in block 410, vehicle 12 may be moving at a first speed (e.g., for purposes of illustration only, first speed may be 50 mph).

In block 420 which follows, computer 14 may determine a highway assist mode trigger. As discussed above, this trigger may include computer 14 receiving GPS data from the vehicle's positioning unit 22 indicating that the vehicle 12 is located on expressway 16 (e.g., which may have a posted speed limit of 70 mph). In another example, this trigger may be vehicle data indicating that the vehicle 12 is maintaining and/or exceeding a predetermined speed threshold (e.g., at least 50 mph) for a predetermined duration (e.g., 6 seconds). Other trigger examples exist as well (as discussed (above). Absent the programming instructions of computer 14 (discussed herein), the driver assist system 10 may cause the vehicle 12 to initiate the highway assist mode, based on at least one of these triggers. However, before initiating the highway assist mode, in the present example, computer 14 executes the instructions associated with block 430.

In block 430, using vehicle-location data, the computer 14 attempts to verify the trigger before initiating the highway assist mode. According to at least one example, computer 14 requires at least one (e.g., sometimes additional) vehicle-location data in order to verify the trigger. Continuing with an example discussed above—wherein computer 14 has previously received vehicle-location data (GPS data) from its positioning unit 22—computer 14 receives and evaluates one or more other vehicle-location data (e.g., such as GPS correction data, cloud-map data, on-ramp data, drive history data, driver study data, just to name a few examples).

In block 440, if computer 14—using the one or more (other) vehicle-location data verifies the trigger, then process 400 proceeds to block 460. And if computer 14—using the one or more (other) vehicle-location data—does not or cannot verify the trigger, then process 400 proceeds to block 450. Verification includes determining concurrence of the vehicle's actual location based on both the trigger (of block 420) and the vehicle-location data (of block 430). For example, using FIG. 1 to illustrate, if the trigger indicates that vehicle 12 is located on expressway 16 and the vehicle-location data also indicates that vehicle 12 is located on the expressway 16, then the trigger is verified. To further illustrate, computer 14 may receive (via base station 36) a wireless message comprising GPS correction data, and using this data, computer 14 may re-calculate the vehicle's position using both its GPS data (from positioning unit 22) and the GPS correction data (from base station 36). Such base station messages may be free broadcasted basic safety messages in accordance with so-called V2X DSRC standards and compliant with the National Highway Traffic Safety Administration (NHTSA). If, based on the re-calculation, the computer 14 determines that vehicle 12 is in fact on expressway 16 (rather than service drive 18), then the trigger is verified. And if, based on the re-calculation, the computer 14 determines that vehicle 12 is not on expressway 16 (but instead is on service drive 18), then the trigger is not verified.

According to another verification example, computer 14 may receive cloud-map data from server 42 via wireless communication network 40 (e.g., from a commercial or backend digital mapping, traffic, etc. service). The cloud-map data may report a roadway accident on expressway 16 (e.g., bringing average vehicle speeds on the respective roadway to 10-15 mph); however, vehicle 12 currently may be traveling in the respective region at the first speed of 50 mph. In this example, computer 14 may not verify the trigger—e.g., determining that the vehicle 12 must not be on the expressway 16, else vehicle 12 too would be driving much slower. Alternatively, for example, the cloud-map data could report average vehicle speeds of 70-75 mph on the respective roadway; in this instance, computer 14 may verify the trigger (e.g., determining that the vehicles 26, 27 traveling at 70-75 mph are likely to be on expressway 16, else they would not be driving at such speeds).

Figure 3:
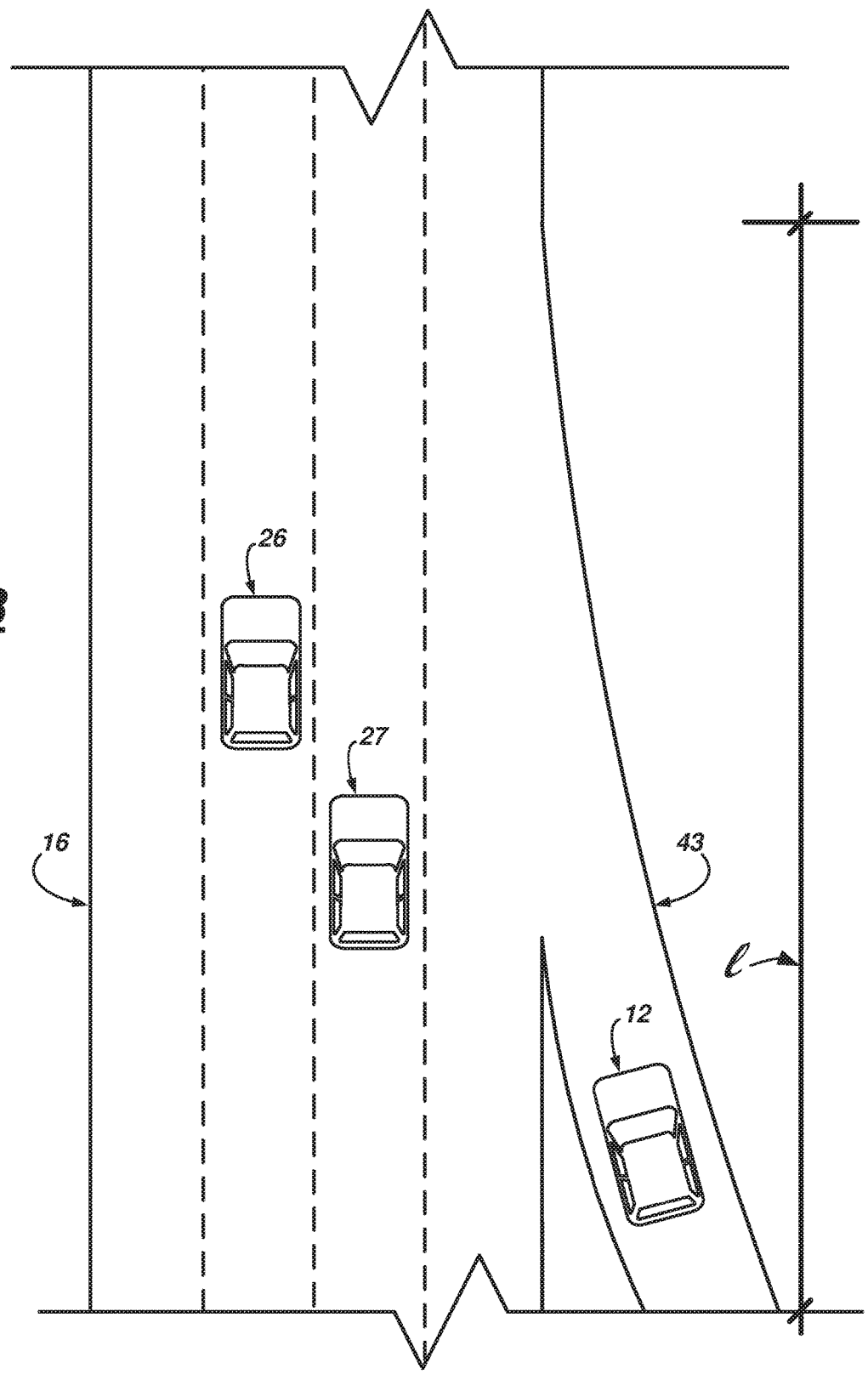
FIG. 3 illustrates a schematic view of the vehicle of FIG. 2 traveling on an expressway on-ramp which merges with an expressway.

In another verification example, computer 14 may receive and/or determine on-ramp data and use this information to verify the trigger. For example, vehicle 12 may enter a roadway (e.g., expressway 16) via a vehicle on-ramp 43 (FIG. 3). As described above, vehicle 12 may determine the length (l) of the on-ramp 43 by measuring it, receiving via digital map data, or the like. Regardless of how computer 14 determines the length (l), computer 14 may compare this length (l) with a look-up table of on-ramp lengths stored in computer memory 30 to determine whether the length was suitable for expressway entry (e.g., having a posted speed limit of 70 mph). If the length (l) is equal to or greater than a length stored in the look-up table (that is associated with an expressway on-ramp, wherein the expressway posted speed limits is 70 mph), then computer 14 may verify the trigger. And if the length (l) is less than a length stored in the look-up table for a respective expressway on-ramp, then computer 14 may not verify the trigger. In at least one example, the computer 14 may store this on-ramp data in memory 30 for a period of time—e.g., using this on-ramp data to determine whether to initiate the highway assist mode at a later time (e.g., while the vehicle 12 remains on the respective roadway).

According to yet another verification example, computer 14 may receive drive history data—e.g., from memory 30 and/or from server 42. If drive history data indicates vehicle 12 rarely (e.g., less than 10% of the time) or never drives on the respective roadway at speeds over 30 mph, computer 14 may not verify the trigger—e.g., presuming that, even though the vehicle is moving currently at 50 mph, that this is likely not expressway 16. Of course, if drive history data indicates otherwise (e.g., that vehicle 12 rarely drives slower than 60 mph on this roadway), then computer 14 instead may verify the trigger.

According to yet another example, computer 14 may receive driver study data—e.g., from server 42. If the surveyed users (of the driver study) indicated that they typically drive 75-80 mph on the respective roadway, the computer 14 may verify the trigger. Or for example, if the surveyed users indicated that they typically drive 35-40 mph on the respective roadway, the computer 14 may not verify the trigger.

These are merely examples of how vehicle-location data such as GPS correction data, cloud-map data, on-ramp data, drive history data, and driver study data could be used to verify the trigger received in block 420. Any of these vehicle-location data (or other vehicle-location data) may be used in combination with one another to verify or not verify the trigger. It should be appreciated that when the trigger is not verified by computer 14, this does not imply that the driver may not use vehicle controls (e.g., knobs, switches, etc.) to manually initiate the highway assist mode; it simply means that when the trigger is not verified, computer 14 may not initiate the mode.

In block 450, when the trigger is not verified, computer 14 may inhibit the initiation of the highway assist mode. Thus, the highway assist mode may not be initiated by computer 14. Thereafter, process 400 may loop back and repeat blocks 410, 420, 430, and 440.

In block 460, when the trigger is verified using one or more of the vehicle-location data, computer 14 may initiate the highway assist mode. Continuing with the example above, this may include computer 14 causing the vehicle 12 to accelerate from the first speed (e.g., 50 mph) to a second, faster speed (e.g., 70 mph; e.g., the posted speed limit of expressway 16). Further, for at least a period of time, computer 14 may control acceleration, braking, and steering of vehicle 12 for a better user-experience. Thereafter, process 400 may end.

Still other examples of vehicle-location data exist. For example, to verify the trigger, computer 14 may use vehicle-location data in the form of vehicle-to-vehicle (V2V) information and other vehicle-to-infrastructure (V2I) information.

According to yet another example, computer 14 may weigh (e.g., comparatively) some of the vehicle-location data. For example, GPS differential data, driver study data, drive history data could be weighed more heavily than on-ramp or cloud-map data. This is merely one example; others exist. Weights could be predetermined and may be any suitable values. In this manner, a matrix of multiple vehicle-location data may be used to verify the trigger, wherein at least some of the vehicle-location data may have different weights.

Thus, there has been described a driver assist system for a vehicle. The system includes a computer that can inhibit initiation of a highway assist mode using a verification technique. The verification technique includes the computer evaluating one or more vehicle-location data in response to a trigger of the highway assist mode.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, comprising:
a processor and memory storing instructions executable by the processor, the instructions comprising, to:
prior to initiating a highway assist mode that adjusts a speed of a vehicle, determine a type of roadway upon which the vehicle is moving based on detecting that the speed of the vehicle is equal to or greater than a predetermined threshold for a predetermined duration of time;
determine a location of the vehicle based on one or more vehicle-location data;
verify the vehicle is one of (a) on an expressway, or (b) not on an expressway based on the location of the vehicle and the determined roadway type; and
then, upon verifying that the vehicle is on the expressway, initiate the highway assist mode, and upon verifying that the vehicle is not on the expressway, inhibit initiation of the highway assist mode.

2. The computer of claim 1, wherein the data comprises GPS data and differential GPS data.

3. The computer of claim 1, wherein determining the location further comprises, prior to inhibiting initiation, to: receive GPS data; receive GPS correction data from a base station; and use the GPS data and GPS correction data to identify the location.

4. The computer of claim 1, wherein data comprises GPS correction data.

5. The computer of claim 1, wherein data comprises cloud-map data that includes vehicle speeds on the expressway at a particular time, wherein the instructions further include instructions to determine the vehicle is on the expressway based on the speed of the vehicle being within a range of vehicle speeds on the expressway at the particular time.

6. The computer of claim 1, wherein the data comprises on-ramp data.

7. The computer of claim 6, wherein the on-ramp data comprises a length of an on-ramp, wherein the instructions further include instructions to derive a speed limit of a respective roadway based on the length, and to determine the vehicle is on the expressway based on the speed limit of the respective road being equal to or greater than a threshold.

8. The computer of claim 6, wherein the on-ramp data comprises a length of an on-ramp, wherein the instructions further include instructions to determine the vehicle is on the expressway based on the length of the on-ramp being equal to or greater than a threshold.

9. The computer of claim 1, wherein the data comprises drive history data.

10. The computer of claim 9, wherein the drive history data is an average of vehicle speed history for a single driver of the vehicle on a respective roadway, wherein the instructions further include instructions to determine the vehicle is on the expressway based on the average of vehicle speed history for the single driver of the vehicle on the respective roadway being above a threshold.

11. The computer of claim 9, wherein the drive history data is an average of vehicle speed history for multiple drivers of the vehicle on a respective roadway, wherein the instructions further include instructions to determine the vehicle is on the expressway based on the average of vehicle speed history for multiple drivers of the vehicle on the respective roadway being above a threshold.

12. The computer of claim 1, wherein the data comprises driver study data that is a compilation of speeds of other types of vehicles moving on a respective roadway, wherein the instructions further include instructions to determine the vehicle is on the expressway based on the speeds of the other types of vehicles moving on the respective roadway being above a threshold.

13. The computer of claim 1, wherein the instructions further include instructions to determine the type of roadway based further on GPS data.

14. The computer of claim 1, wherein the instructions further include instructions to determine the type of roadway based further on a maximum rate of curvature of the roadway.

15. The computer of claim 1, wherein the instructions further include instructions to determine the type of roadway based further on a speed limit of the roadway being equal to or greater than a threshold.

16. The computer of claim 1, wherein the instructions further include instructions to determine the type of roadway based further on an average speed of other vehicles on the roadway.

17. A method, comprising:
prior to initiating a highway assist mode that adjusts a speed of a vehicle, determining, at a computer in a vehicle, a type of roadway upon which the vehicle is moving based on detecting that the speed of the vehicle is equal to or greater than a predetermined threshold for a predetermined duration of time;
determining a location of the vehicle based on one or more vehicle-location data;
verifying the vehicle is one of (a) on an expressway, or (b) not on an expressway based on the location of the vehicle and the determined roadway type; and
then, upon verifying that the vehicle is on the expressway, initiating the highway assist mode, and upon verifying that the vehicle is not on the expressway, inhibiting initiation of the highway assist mode.

18. The method of claim 17, wherein determining the location further comprises evaluating at least one of: differential GPS data, cloud-map data, on-ramp data, drive history data, or driver study data.

19. The method of claim 17, further comprising deriving a speed limit of a respective roadway based on a length of an on-ramp, and determining the vehicle is on the expressway based on the speed limit of the respective road being equal to or greater than a threshold.

20. The method of claim 17, further comprising determining the vehicle is on the expressway based on a length of an on-ramp being equal to or greater than a threshold.

* * * * *